(12) United States Patent
Kaller

(10) Patent No.: US 7,443,500 B2
(45) Date of Patent: Oct. 28, 2008

(54) APPARATUS FOR SCATTERED LIGHT INSPECTION OF OPTICAL ELEMENTS

(75) Inventor: Julian Kaller, Koenigsbronn (DE)

(73) Assignee: Carl Zeiss SMT AG, Oberkochen (DE)

( * ) Notice: Subject to any disclaimer, the term of this patent is extended or adjusted under 35 U.S.C. 154(b) by 395 days.

(21) Appl. No.: 10/886,717

(22) Filed: Jul. 9, 2004

(65) Prior Publication Data
US 2005/0046832 A1  Mar. 3, 2005

(30) Foreign Application Priority Data
Jul. 9, 2003  (DE) ................. 103 32 110

(51) Int. Cl.
*G01N 21/00* (2006.01)
(52) U.S. Cl. .............. 356/239.2; 356/445; 356/237.3
(58) Field of Classification Search ............. 356/239.1, 356/239.2, 446, 237.1
See application file for complete search history.

(56) References Cited

U.S. PATENT DOCUMENTS

| 3,652,863 | A | | 3/1972 | Gaskell et al. | |
|---|---|---|---|---|---|
| 3,814,946 | A | | 6/1974 | Takahashi et al. | |
| 4,402,607 | A | | 9/1983 | McVay et al. | |
| 4,989,985 | A | * | 2/1991 | Hubble et al. | 356/446 |
| 5,591,985 | A | | 1/1997 | Tsuji et al. | |
| 5,767,523 | A | | 6/1998 | McCullough | |
| 5,963,315 | A | * | 10/1999 | Hiatt et al. | 356/237.3 |
| 6,091,486 | A | | 7/2000 | Kirk | |
| 6,496,257 | B1 | * | 12/2002 | Taniguchi et al. | 356/239.2 |
| 6,809,809 | B2 | * | 10/2004 | Kinney et al. | 356/237.5 |

FOREIGN PATENT DOCUMENTS

| DE | 44 23 802 A1 | | 1/1996 |
|---|---|---|---|
| DE | 197 39 679 A1 | | 10/1998 |
| DE | 198 27 183 A1 | | 12/1999 |
| DE | 199 62 779 A1 | | 6/2001 |
| EP | 1 231 517 A1 | | 8/2002 |
| JP | 08338785 A | * | 12/1996 |
| JP | 08338810 A | * | 12/1996 |

* cited by examiner

*Primary Examiner*—L. G. Lauchman
*Assistant Examiner*—Juan D Valentin
(74) *Attorney, Agent, or Firm*—Sughrue Mion, PLLC

(57) ABSTRACT

An apparatus for scattered light inspection of optical elements, having a light-generating unit (2) for generating light that is irradiated onto the optical element (9) respectively to be inspected, and a detector (4) for detecting scattered light (14) that is emitted by the optical element during irradiation. At least a portion of the components (2 to 8, 12) of the inspection apparatus are arranged on or in a housing/holding unit (1) that is dimensioned such that it can be held by a reticle holder of a lithography exposure machine, or all the components of the inspection apparatus are arranged on or in a common housing/holding unit that is portable and/or mobile. The apparatus may be used, e.g., for scattered light inspection of the surface of a lens, closest to the field, of a projection objective of a microlithography projection exposure machine.

20 Claims, 1 Drawing Sheet

APPARATUS FOR SCATTERED LIGHT INSPECTION OF OPTICAL ELEMENTS

The following disclosure is based on German Patent Application No. 103 32 110.1 filed on Jul. 9, 2003, which is incorporated into this application by reference.

BACKGROUND OF THE INVENTION

1. Field of the Invention

The invention relates to an apparatus for scattered light inspection of optical elements, in particular of lens surfaces, having a light-generating unit for generating light that is irradiated onto the optical element respectively to be inspected, and a detector for detecting scattered light that is emitted by the optical element during irradiation.

2. Description of the Related Art

Such apparatuses are variously known and are chiefly used to detect the quality of optical elements such as, for example, lenses, by means of scattered light inspection. This is particularly important for optical elements that are used in high-resolution optical systems. Compared with traditional, visual inspection, the use of scattered light inspection apparatuses enjoys the advantage of a higher level of objectivity owing to their angularly resolved quantitative measurement, and of a better possibility of documentation. Moreover, the risk of damaging the optical element to be inspected is less. One application is optical elements of exposure machines in microlithography for the purpose of semiconductor wafer exposure. Surface roughnesses on surfaces of lenses used there, for example, in a projection objective, which can be caused by contaminants or surface damage have given rise in the exposure mode to parasitic scattered light that falls outside the structures to be exposed onto a wafer and thereby reduces the contrast of the imaging. This has direct effects on the minimum achievable critical dimension of wafer structures, and on its uniformity.

The closer the scattering surface is to the field, the more strongly the scattered light is concentrated onto the near zone about the structure to be exposed. Such so-called short range scattered light has the greatest influence on the uniformity of the minimum achievable critical dimension, and is therefore particularly disturbing during the lithography process. Scattered light inspection is therefore useful, in particular, for the surface of a first lens, closest to the field, in a microlithography projection exposure machine in order to determine whether and, if appropriate, which surface roughnesses and/or surface contaminants this lens has. It is also frequently desirable to perform scattered light inspection of the lens on the output side, closest to the wafer, of a projection objective of the exposure machine, since this lens is exposed to instances of degassing, for example of photoresist layers of a wafer to be exposed.

Surface contaminants are observed on virtually all customary DUV and VUV projection exposure systems. Various contaminant morphologies are to be observed, depending on composition and origin, such as dendrites, spherical shapes, flat sharp-edged crystals, etc. In this case, there also seem to be relationships between the microscopic appearance of contaminants and their ability to be removed.

Scattered light inspection apparatuses are conventionally stationary systems into which the optical element respectively to be inspected is to be introduced. In this case, these systems typically comprise a number of modules that are to be handled individually and each have a dedicated housing, for example a laser unit as a first, light-generating module, and a scattered light sensor as a further, autonomous module. In the case of the abovementioned microlithography projection objective lens, this means that such a stationary apparatus can be used to inspect the lens only before it is firstly installed in the microlithography machine, and thus before its use in the exposure mode, or that the lens must be removed for inspection. Firstly, this necessitates outlay on staff, and secondly lengthy times, typically of several weeks, on downtime for the system, and this renders regular inspection completely uneconomical.

Such stationary scattered light inspection systems are known in a great variety of designs—see, for example, patents U.S. Pat. No. 3,652,863 and U.S. Pat. No. 3,814,946 and the laid-open patent applications DE 44 23 802 A1, DE 197 39 679 A1 and DE 198 27 183 A1.

SUMMARY OF THE INVENTION

The invention is based on the technical problem of providing a scattered light inspection apparatus of the type mentioned at the beginning that, by contrast with the conventional stationary systems, offers handling advantages and, for example, if required, permits inspection of the surface of a lens closest to the field, or of a lens closest to the wafer, of a microlithography projection objective in its state when installed in the objective.

The invention solves this problem by means of the provision of an apparatus for which it is specifically provided that at least a portion of the components of the inspection apparatus is arranged on or in a housing/holding unit that is specifically dimensioned such that it can be held by a reticle holder and/or a substrate holder of a lithography exposure machine, it being possible for the substrate holder to be, in particular, a wafer holder, that is to say the substrates to be exposed in the exposure machine are semiconductor wafers in this case. This permits surface inspection of a lens, closest to the field and/or closest to the substrate, of the projection objective of such an exposure machine without the need for the relevant lens to be removed for this purpose, as well as surface inspection of an optical element, located in front of or above the reticle, of an illumination system of the exposure machine. In order to inspect the lens closest to the field, at least the light-generating unit and the detector are arranged on or in the holder, which is then inserted into the reticle holder for the purpose of scattered light inspection of the lens surface, after which the reticle holder is brought into its operating position. The surface inspection process can then be carried out on the lens closest to the field in its installed state, it being possible for the data obtained by the detector to be evaluated immediately on the spot by an evaluation unit, likewise arranged on or in the housing/holding unit, or to be transmitted by teletransmission to an externally situated evaluation unit, or to be stored in a memory arranged on or in the housing/holding unit. In an appropriate design, the apparatus can also be positioned in a wafer holder such that it is possible to inspect the lens, located above the wafer, of the projection objective, which is contaminated with particular ease by degassings of, for example, a photoresist.

Since there is no need to remove the lens, this automated, compact scattered light inspection apparatus permits inspection of the outer, nearest lens of the projection objective or illumination system during a comparatively short operational interruption of less than one hour, mostly less than half-an-hour, no intervention being required in the hardware of the lithography system.

In a further aspect the invention provides for an apparatus in which all the apparatus components are specifically arranged on and/or in a common housing/holding unit that is portable and/or mobile. This implements a compact automated scattered light inspection apparatus that can be handled easily and can therefore be used flexibly. The apparatus can be brought to a respective desired inspection site without any problem, that is to say by contrast with traditional systems there is no need to transport the optical element to be inspected, but rather the scattered light inspection apparatus can be brought to the site of the optical element for the purpose of subjecting it to scattered light inspection.

In an advantageous refinement of the invention, the apparatus comprises further components depending on requirement such as a beam-shaping optic that is positioned downstream of the light-generating unit, an evaluation unit that can be coupled to the detector, an image memory, an interface for external communication, and/or a power supply unit. It is therefore possible to expand the functionalities of the apparatus appropriately, the further components preferably likewise being integrated in the housing/holding unit.

In a further refinement of the invention, the detector comprises a CCD unit, a CMOS image sensor, a diode array, a line sensor, a discrete photodiode or a photomultiplier. The two lastnamed detector elements are advantageous with regard to sensitivity. The other named detector elements offer the possibility of angularly resolved scattered light detection, and can be combined with an image intensifier.

In a further refinement of the invention, the detector can be designed such that it also detects light that is reflected specularly, that is to say directly without being scattered, by the optical element to be inspected. It is possible therefrom to obtain information on the reflectance behavior of the surface of the inspected element for the relevant wavelength and the relevant angle of incidence with the aid of which, for example, it is possible to draw conclusions on any possible homogeneous contamination films on the surface.

In a development of the invention, the light-generating unit is designed to irradiate, at least two different angles, inspection light onto a respective inspection site of the optical element to be inspected. When use is made of a stationary resolving detector and a suitably designed evaluation unit, it is then possible to use image processing for the purpose of separately detecting the scattered light fraction of two opposite surfaces of the inspected optical element, for example the top side and underside of a lens, and this further improves the information content of the scattered light inspection.

In a further refinement of the invention, the light-generating unit is designed to output inspection light at least two different wavelengths, and the evaluation unit is designed correspondingly for wavelength-selective detection and evaluation of the scattered light information.

BRIEF DESCRIPTION OF THE DRAWINGS

An advantageous embodiment of the invention is illustrated in the drawings and explained below. In the drawings.

DETAILED DESCRIPTION OF PREFERRED EMBODIMENTS

Figure 1:
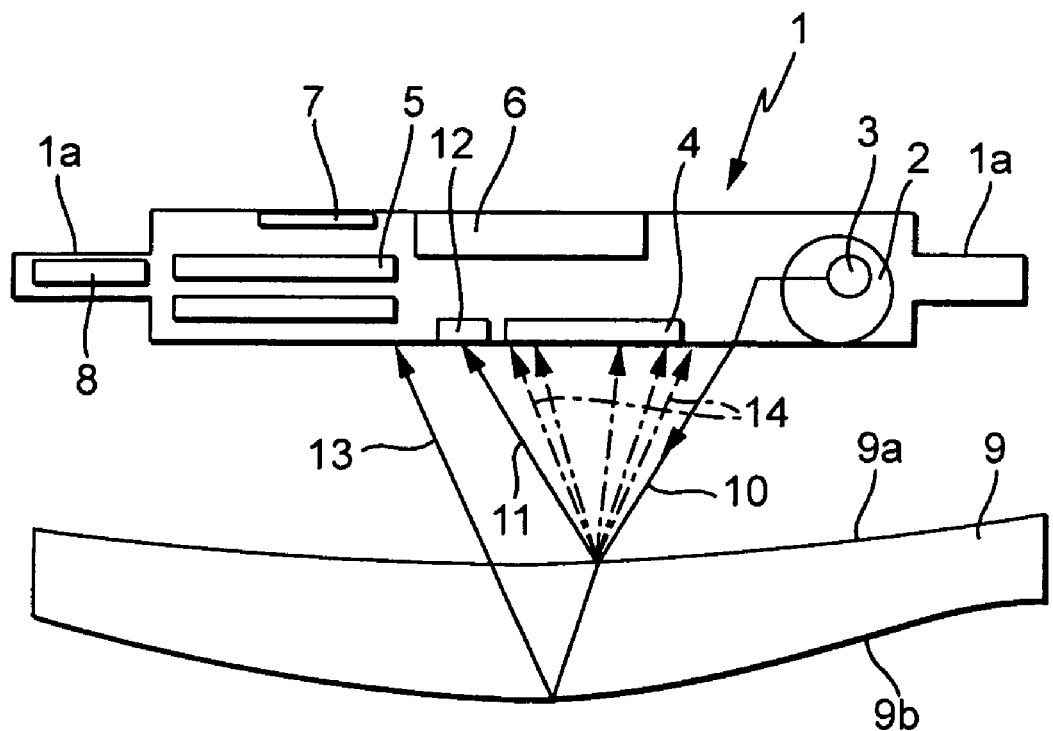
FIG. 1 shows a schematic side view of a scattered light inspection apparatus that is accommodated in a housing and can be inserted into a reticle holder of a lithography exposure machine during an inspection operation on a lens, closest to the field, of a projection objective of the exposure machine.

In the scattered light inspection apparatus shown schematically in FIG. 1, all components are arranged in a housing unit 1 whose outer contour is configured such that it can be used in a conventional reticle holder of a microlithography projection exposure machine instead of a reticle used in the normal wafer exposure. For this purpose, the housing unit 1 is of relatively flat design and has a holding flange 1a at the circumference. As essential functional components, the scattered light inspection apparatus includes a light-generating unit 2 with one or more lasers of small volumes, for example a respective diode laser with driver electronics, a beam-shaping optics 3, a detector 4, an evaluation processor 5, an image memory 6, a for example optical communication interface 7, and one or more batteries 8 as power supply. As an alternative to the accommodation in the housing unit 1, it can be provided to arrange the components 2 to 8 of the inspection apparatus on an appropriately configured holding unit.

As shown schematically in FIG. 1, all said components 2 to 8 of the apparatus are mounted in the housing unit 1. FIG. 1 shows the apparatus during an inspection operation for checking the surface of a first lens 9, closest to the field, of a projection objective of the microlithography exposure machine, specifically of the top side 9a and underside 9b thereof. The components of the lithography machine are, generally, all of conventional type, and are therefore not shown for the sake of simplicity in FIG. 1. All that is essential is that the housing unit 1 is dimensioned such that it can be inserted into the reticle holder of the lithography machine for the purpose of carrying out inspection operations for the lens 9 closest to the field, after which it is automatically transferred, like a reticle, into the so-called reticle stage, which is the inspection position in accordance with FIG. 1.

The respective laser diode 2 generates a light beam 10 that the beam-shaping optic 3 collimates, focuses and projects obliquely onto an inspected surface element of the lens 9. This surface element can, for example, have a typical dimension of the order of magnitude of 1 mm$^2$.

A light fraction 11 reflected specularly, that is to say without scattering, by the top side 9a of the lens reaches the scattered light inspection apparatus at an impingement point 12 that is implemented as a so-called blackened beam dump, or at which a photodiode can be provided as part of the detector 4. The first-named option absorbs this light fraction 11 and prevents disturbing influences owing to multiple reflection. When the last-named option is selected, this specularly reflected light fraction 11 can be detected via the photodiode, and from this the evaluation processor 5, which is coupled to the detector 4 including the optional photodiode, can obtain information on the reflectance behavior of the reflecting surface for the laser wavelength used and the angle of incidence used. This information can be used for the purpose of drawing conclusions on any possible homogeneous contamination film on the lens surface. The procedure is similar in the case of light 13 reflected specularly by the lens underside 9b.

Various conventional implementation options are suggested for the detector 4, in particular as a CCD element, as a CMOS image sensor element, as a diode array, as a line sensor, each of these implementations possibly being combined with an image intensifier as a discrete photodiode or as a photomultiplier. The two last-named implementations are particularly suitable for detecting an integrated scattered light signal over an angular range which is determined by the position and the size of the detector element. These variants are distinguished by their very high sensitivity. The other detector implementations named render it possible to carry out angularly resolved measurement over the angular range determined by the position and size of the detector element.

Moreover, information on the morphology of the scattering centers on the lens surface can be gathered in a semi-empirical fashion.

Scattered light 14, which passes from the irradiated region of the lens 9 to the detector 4, is detected by the latter and, specifically, this is done, as mentioned, integrally or with angular resolution depending on the detector type. The evaluation processor 5 picks up the scattered light information detected by the detector 4, and evaluates it, preferably by using an appropriate image processing algorithm. Information obtained by it thereby is stored in the image memory 6, which can be, for example, a memory card such as is used in digital cameras, and is commercially available in the smallest design with a memory capacity of up to 512 Mbit. The memory card 6 is extracted after the measurement operation, and the information stored in it can then, for example, be read into a PC or laptop and processed further there.

In order to inspect the entire surface of the lens 9, in each case after an individual inspection operation for the respectively irradiated surface spot of the lens 9 has ended, the reticle stage is moved laterally in a scanning fashion such that the scattering behavior of the entire surface of the lens 9 can be determined with spatial resolution. The optional communication interface 7 can be used for this purpose as a scattering interface via which control information for the respective image-recording operation and/or for the scanning movement of the reticle stage can be transmitted. The communication interface 7 can, for example, include radio signal transmission to a receiver inside or outside the lithography machine.

As an alternative to a control via the interface 7, the image-recording operation and the movement of the reticle stage can be performed under time control. For this purpose, the scattered light inspection apparatus implemented as a module can include an internal quartz clock which alternatingly exerts control for one second, for example, on an inspecting image-recording operation, and then, for example, switches for a second to waiting while, in a fashion offset parallel therewith, a control unit of the lithography machine respectively moves the reticle stage during the waiting time of image recording, and switches the reticle stage to waiting during the period of an image-recording operation.

In a further possible implementation, the communication interface 7 can have one or more photoreceivers at the housing top side, which faces an illumination system of the lithography machine during use in the reticle stage. With the aid of a laser of this illumination system or of an auxiliary laser otherwise used primarily, as customary, for adjusting purposes, this photoreceiver arrangement can transmit control commands optically to the scattered light inspection apparatus in the housing unit 1.

As an option, additional information relating to the state of the surface of the lens 9 can be obtained by determining the scattering behavior of the said lens by measuring scattered light as a function of wavelength at two or more different wavelengths. This can be implemented, for example, by using as light-generating unit 2 an appropriate number of laser units which emit light of different wavelengths, for example with wavelengths of 650 nm and 404 nm.

Figure 2:
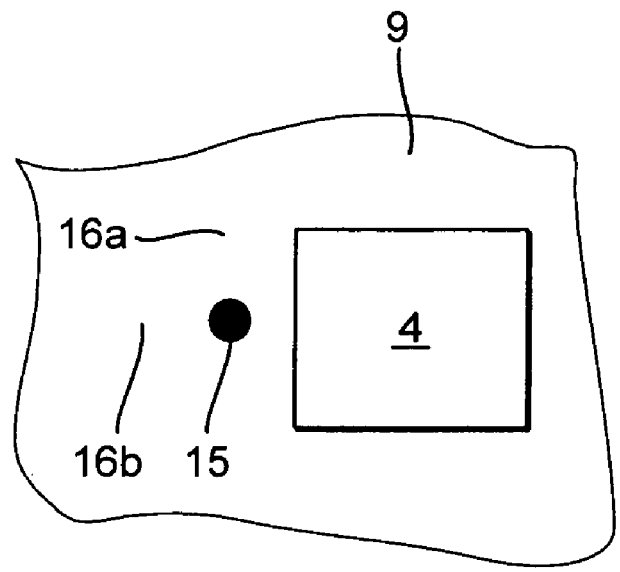
FIG. 2 shows a schematic detail of a plan view from above of the inspected lens in accordance with FIG. 1 in an application comprising different inspection of the top side and underside of the lens.

Furthermore, the scattered light inspection apparatus can be designed to detect and evaluate the scattered light fractions from the top side 9a and the underside 9b of the lens 9 distinguishably. For this purpose, the light-generating unit 2 in this case includes two point light sources, for example laser diodes, which are tuned together with the beam-shaping optic 3 such that they respectively irradiate the same spot of the top side at different angles of incidence. Shown diagrammatically in FIG. 2 is such an inspection operation, in which the light of the two point light sources falls onto a common point of impingement 15 on the top side. The different angles of incidence give rise to different points of impingement 16a, 16b on the underside of the lens on the two light beams. Since a detector of the spatially resolving type is used for the detector 4, it is then possible with the aid of suitable image processing to separate the scattered light fraction of the top side of the lens from that of the underside of the lens, thus consequently permitting separate statements on the nature of the surface of the top side of the lens, on the one hand, and on the nature of the surface of the underside of the lens, on the other hand.

The internal power supply unit 8 renders the scattered light inspection apparatus independent of an external power supply. Commercially available batteries of high energy density and small design can be used and are sufficient. Again, the remaining components 2 to 7 of the apparatus are already available commercially in designs which are compatible with the requirements obtained here for space and weight, that is to say they permit them to be integrated on or in the housing unit 1. Red laser diodes of multivarious types are, for example, commercially available for the light-generating unit 2, but also commercially available are suitable green and blue laser diodes. The power of appropriate battery-operated, small laser diode modules is sufficient for the present scattered light inspection task.

It is apparent that the position, shown diagrammatically in FIG. 1, of the individual components 2 to 8 of the apparatus on or in the housing unit 1 is merely exemplary and can vary depending on what is required. In particular, the angle of irradiation at which the inspection light falls onto the surface to be inspected can be set by an appropriate arrangement and design of the light-generating unit 2 and of the beam-shaping optic 3 such that the scattered light irradiated back permits the surface structure to be detected optimally.

Thus, as a whole the scattered light inspection apparatus shown permits automated inspection of the surface of the first lens 9 of the lithography projection objective without the need to remove the latter for this purpose. The scattering behavior of the lens surface can be determined with high spatial resolution, and the apparatus delivers quantitative statements about the quantity of scattered light in the observed range of solid angle. When scattered light is detected with angular resolution, it is also specifically possible to make statements about the size and morphology of scattering centers whose causes such as, for example, contamination, the growth of salt or layer damage, can then be determined by means of empirical methods, for example. As an option, the nature of the surface of the objective lens can be determined separately for its top side and its underside.

Since the apparatus is used as a reticle substitute in the reticle stage of the lithography machine, the scattered light inspection is associated with relatively short switch off times for the lithography machine, and this renders it possible, in turn, for inspection by scattered light with the aid of this apparatus to be used more often for control purposes at regular intervals or upon suspicion of contamination. Consequently, a possible contamination or damage to a surface layer, such as an antireflection layer, can be detected relatively early such that it is possible to take correspondingly early countermeasures. This also holds for systems having so-called purgehoods, for which possible malfunctioning can be detected early by means of a spatially resolved, sensitive scattered light measurement. When the apparatus is operating with a plurality of different inspection wavelengths, the analysis of the scattering behavior permits even more accurate statements on the size and morphology of scattering centers determined. The apparatus shown has the further advantage that it requires no diaphragm device in the immediate vicinity of the optical surface to be inspected.

In the exemplary embodiment shown, the scattered light inspection apparatus is integrated in a housing unit 1 which is adapted for insertion into a reticle holder of a lithography machine. It is apparent that in alternative embodiments of the invention the scattered light inspection apparatus can also be integrated in any other housing/holding unit with the aid of which the apparatus can then also be used for scattered light inspection of any other optical elements in any other optical systems. It is also apparent that it is not always necessary for all the components of the scattered light inspection apparatus to be integrated in the housing/holding unit. Rather, depending on the application, it can already suffice when only the light-generating unit and the detector and, if it is provided, the beam-shaping optics are integrated in the common housing/holding unit, while the remaining components of the apparatus can also be arranged externally if required.

In the same way as described above in relation to the inspection of a lens, closest to the field, of the projection objective, it is possible to inspect an optical element, on the reticle side, that is to say on the exit side, of an illumination system of a microlithography projection exposure machine. In further embodiments of the invention, the inspection apparatus can be inserted via a so-called wafer stage in order to inspect an exit-side element, closest to the wafer, of the projection objective.

In all the embodiments of the invention explained above, and in other ones, any desired medium can be introduced in the space between the inspected optical element or device under test and the scattered light inspection apparatus. This can be, in particular, ambient air, another gas atmosphere or a vacuum. It is also possible in advantageous implementations to introduce an immersion liquid which fills up the corresponding interspace entirely or partially.

The above description of the preferred embodiments has been given my way of example. From the disclosure given, those skilled in the art will not only understand the present invention and its attendant advantages, but will also find apparent various changes and modifications to the structures and methods disclosed. It is sought, therefore, to cover all changes and modifications as fall within the spirit and scope of the invention, as defined by the appended claims, and equivalents thereof.

The invention claimed is:

1. An apparatus for scattered light inspection of optical elements, comprising:
   a plurality of components, wherein a first component is a light-generating unit generating light that is irradiated onto the optical element respectively to be inspected, and
   a second component is a detector detecting scattered light that is emitted by the optical element during irradiation,
   wherein the first component and the second component are arranged on or in a unit that is held by a reticle holder of a lithography exposure machine; and
   wherein the detected by the detector comprises light scattered outside a specular angle for reflection.

2. The inspection apparatus as claimed in claim 1, further comprising: at least one of a beam-shaping optics, an evaluation unit, an image memory, a communication interface, and a power supply unit.

3. The inspection apparatus as claimed in claim 1, wherein the detector includes at least one of a CCD unit, a CMOS image sensor, a diode array, a line sensor, a discrete photodiode unit and a photomultiplier unit.

4. The inspection apparatus as claimed in claim 1, wherein the detector is designed also to detect light reflected specularly from the optical element respectively to be inspected.

5. The inspection apparatus as claimed in claim 1, wherein the light-generating unit is designed to irradiate, at least two different angles, inspection light onto a respective inspection site of the optical element to be inspected.

6. The inspection apparatus as claimed in claim 1, wherein a space between the optical element to be inspected and the inspection apparatus is at least partially filled with an immersion liquid.

7. An apparatus for scattered light inspection of optical elements, comprising:
   a plurality of components, wherein a first component is a light-generating unit generating light that is irradiated onto the optical element respectively to be inspected, and a second component is a detector detecting scattered light that is emitted by the optical element during irradiation,
   wherein at least one of the plurality of components is arranged on or in a unit that is dimensioned to be held by a reticle holder or a substrate holder of a lithography exposure machine; and
   wherein the light-generating unit is designed to output inspection light with at least two different wavelengths, and the evaluation unit is designed for wavelength-selective evaluation of the scattered light information.

8. An apparatus for scattered light inspection of an optical element of a lithography exposure machine, comprising:
   a light-generating unit for generating light that is irradiated onto the optical element respectively to be inspected, and
   a detector for detecting scattered light that is emitted by the optical element of the lithography exposure machine during irradiation,
   wherein substantially all the components of the inspection apparatus are arranged on or in a common unit that is portable or mobile and is attached to a reticle holder of the lithography exposure machine; and
   wherein the light detected by the detector comprises light scattered outside a specular angle of reflection.

9. The inspection apparatus as claimed in claim 8, further comprising: at least one of a beam-shaping optics, an evaluation unit, an image memory, a communication interface, and a power supply unit.

10. The inspection apparatus as claimed in claim 8, wherein the detector includes a CCD unit, a CMOS image sensor, a diode array, a line sensor, a discrete photodiode unit or a photomultiplier unit.

11. The inspection apparatus as claimed in claim 8, wherein the detector is designed also to detect light reflected specularly from the optical element respectively to be inspected.

12. The inspection apparatus as claimed in claim 8, wherein the light-generating unit is designed to irradiate, at least two different angles, inspection light onto a respective inspection site of the optical element to be inspected.

13. An apparatus for scattered light inspection of an optical element of a lithography exposure machine, comprising:
   a light-generating unit for generating light that is irradiated onto the optical element respectively to be inspected, and
   a detector for detecting scattered light that is emitted by the optical element of the lithography exposure machine during irradiation, wherein substantially all the components of the inspection apparatus are arranged on or in a common unit that is portable or mobile; and wherein the light-generating unit is designed to output inspection light with at least two different wavelengths, and the evaluation unit is designed for wavelength-selective evaluation of the scattered light information.

14. The inspection apparatus as claimed in claim 8, wherein a space between the optical element to be inspected and the inspection apparatus is at least partially filled with an immersion liquid.

15. An apparatus for scattered light inspection of optical elements comprising:
a plurality of components, wherein
a first component is a light-generating unit generating light that is irradiated onto the optical element respectively to be inspected, and
a second component is a detector detecting scattered light that is emitted by the optical element during irradiation,
wherein the first components and the second component are arranged on or in a common unit that is held by a reticle holder of a lithography exposure machine.

16. The apparatus as claimed in claim 15, further comprising:
an element selected from the group consisting of a beam shaping optics, an evaluation unit, an image memory, a communication interface, and a power supply unit.

17. An apparatus for scattered light inspection of optical elements, comprising:
a plurality of components, wherein
a first component is a light-generating unit generating light that is irradiated onto the optical element respectively to be inspected, and
a second component is a detector detecting scattered light that is emitted by the optical element during irradiation,
wherein at least one of the plurality of components is arranged on or in a unit that is held by a reticle holder of a lithography exposure machine; and
wherein the apparatus is designed for angularly resolved inspection of scattered light over a range of a plurality of predetermined angles.

18. An apparatus for scattered light inspection of an optical element of a lithography exposure machine, comprising:
a light-generating unit for generating light that is irradiated onto the optical element respectively to be inspected, and
a detector for detecting scattered light that is emitted by the optical element of the lithography exposure machine during irradiation,
wherein substantially all the components of the inspection apparatus are arranged on or in a common unit that is portable or mobile, and which is held by a reticle holder of a lithography exposure machine; and
wherein the apparatus is designed for angularly resolved inspection of scattered light over a range of a plurality of predetermined angles.

19. An apparatus for scattered light inspection of optical elements, comprising:
a plurality of components, wherein
a first component is a light-generating unit generating light that is irradiated onto the optical element respectively to be inspected, and
a second component is a detector detecting scattered light that is emitted by the optical element during irradiation, the detector including at least one of a CCD unit, a CMOS image sensor, a diode array, a line sensor, and a photomultiplier unit;
wherein the first component and the second component are arranged on or in a unit that is held by a reticle holder of a lithography exposure machine.

20. An apparatus for scattered light inspection of an optical element of a lithography exposure machine, comprising:
a light-generating unit for generating light that is irradiated onto the optical element respectively to be inspected, and
a detector for detecting scattered light that is emitted by the optical element of the lithography exposure machine during irradiation, the detector including a CCD unit, a CMOS image sensor, a diode array, a line sensor, or a photomultiplier unit
wherein substantially all the components of the inspection apparatus are arranged on or in a common unit that is portable or mobile and is attached to a reticle holder of the lithography exposure machine.

* * * * *